(12) United States Patent
Watanabe

(10) Patent No.: US 7,859,702 B2
(45) Date of Patent: Dec. 28, 2010

(54) IMAGE FORMING APPARATUS AND IMAGE FORMING SYSTEM

(75) Inventor: Taisuke Watanabe, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1045 days.

(21) Appl. No.: 11/362,184

(22) Filed: Feb. 27, 2006

(65) Prior Publication Data

US 2006/0193003 A1 Aug. 31, 2006

(30) Foreign Application Priority Data

Feb. 28, 2005 (JP) ............................. 2005-053739

(51) Int. Cl.
G06K 15/00 (2006.01)
G06F 3/12 (2006.01)
(52) U.S. Cl. .................. 358/1.16; 358/1.1; 358/1.13; 358/1.15
(58) Field of Classification Search ................. 358/1.1, 358/1.9, 1.11–1.18, 1.4, 1.5
See application file for complete search history.

(56) References Cited

U.S. PATENT DOCUMENTS 6,989,907 B1 * 1/2006 Jeyachandran et al. ..... 358/1.15

2005/0105920 A1 * 5/2005 Matsunaga ..................... 399/1
2006/0132816 A1 * 6/2006 Yamamoto et al. ......... 358/1.13
2006/0285148 A1 * 12/2006 Matsushima et al. ....... 358/1.14

FOREIGN PATENT DOCUMENTS

| JP | 08-224922 | 9/1996 |
|---|---|---|
| JP | 2003-054072 A | 2/2003 |
| JP | 2003-177900 A | 6/2003 |
| JP | 2004-223966 A | 8/2004 |
| JP | 2005035145 A | 2/2005 |

* cited by examiner

Primary Examiner—Thierry L Pham
(74) Attorney, Agent, or Firm—Rabin & Berdo, P.C.

(57) ABSTRACT

An image forming apparatus is provided capable of preventing that an operator collects a print result object of which the print job he or she has not sent, and that a user's own print result object is taken by others away from the record medium holding section. The image forming apparatus is used for forming an image onto a record medium which has an identification information section to provide identification information, and includes a print job management information storing section for storing print management information sent from a information processing apparatus per print job to correspond to the identification information; a record medium holding section for keeping print result objects. In the apparatus, the identification information read out from a print result object and print job management information of a print job, are collated.

15 Claims, 17 Drawing Sheets

| PRINT JOB NAME | PASSWORD | MANAGEMENT INFORMATION |
|---|---|---|
| README.TXT | 1234 | ABCD1234 |
| REPORT.DOC | 9876 | ABCD1235~ABCD1238 |
| DAILY REPORT.XLS | 5522 | ABCD1239~ABCD1240 |

*FIG. 4*

JobName="readme.txt"
UserName="Sato"
PassWord="1234"
PrintData ————————————

FIG. 6

| PRINT JOB NAME | MAIL ADDRESS | PASSWORD | MANAGEMENT INFORMATION |
|---|---|---|---|
| README.TXT | sato@aaa.co.jp | 1234 | ABCD1234 |
| REPORT.DOC | suzuki@aaa/co.jp | 9876 | ABCD1235~ABCD1238 |
| DAILY REPORT.XLS | hayashi@aaa/co.jp | 5522 | ABCD1239~ABCD1240 |

| PRINT JOB NAME | MAIL ADDRESS | PASSWORD | PRINT END TIME | MANAGEMENT INFORMATION |
|---|---|---|---|---|
| README.TXT | sato@aaa.co.jp | 1234 | 10 : 23 : 45 | ABCD1234 |
| REPORT.DOC | suzuki@aaa/co.jp | 9876 | 12 : 34 : 56 | ABCD1235~ABCD1238 |
| DAILY REPORT.XLS | hayashi@aaa/co.jp | 5522 | 14 : 34 : 56 | ABCD1239~ABCD1240 |

IMAGE FORMING APPARATUS AND IMAGE FORMING SYSTEM

BACKGROUND OF THE INVENTION

1. Field of the Invention

The invention relates to an image forming apparatus and an image forming system, specially relates to a managing means of print result object and print job.

2. Related Background Art

In recent years, such case becomes more common as a plurality of information processing apparatuses use an image forming apparatus in common via network. In such case, the image forming apparatus receives respective print jobs from the plurality of information processing apparatuses and respectively prints them. Then, print result objects are accumulated in a record medium holding section provided in the image forming apparatus (refer to Patent Document 1: Japan patent publication H08-224922). After that, the sender of the print job collects the print result object of himself/herself from the record medium holding section. In such image forming system, some case occurs as that, for example, the sender collected a print result object of a third party, or on the contrary, the sender's own print result object is taken by a third party away from the record medium holding section.

Further, when the sender of the print job has forgot to collect the print result object of himself/herself, the print result object is placed in the record medium holding section for a long time.

In order to prevent such cases from happening, it is possible to provide the image forming apparatus with a plurality of record medium holding section, then to divide the plurality of record medium holding section into users. However, the image forming apparatus will become a large-scale apparatus, the number of the users will also increase, and therefore it is impossible to correspond to all users.

SUMMARY OF THE INVENTION

It is, therefore, an object of the invention to provide an image forming apparatus and an image forming system capable of solving the mentioned above problems to prevent that the sender collects print result object of others, or that on the contrary, the sender's own print result object is taken by others away from the record medium holding section.

According to the present invention, there is provided an image forming apparatus for forming images onto printable record media each having an identification information section to provide identification information to identify the printable record media, comprising:

a print job management information storing section for storing management information for print jobs, the print job management information being sent from an information processing apparatus per print job and containing separate identification information to identify each of the printable record media on which images for each print job is formed;

a record medium holding section for holding as print result objects the printable record media having images formed thereon; and means for collating the print job management information in the print job management information storing section with the identification information of the print result objects held in the record medium holding section, and judging whether to output a result of the collation.

Moreover, the image forming apparatus may further comprise a print job managing section judge whether all print result objects corresponding to each print job are in the record medium holding section on the basis of the result of the collation.

Moreover, the image forming apparatus may further comprise an identification information writing section to write the identification information into the identification information section; and an identification information reading section to read out the identification information from the identification information section.

Moreover, in the image forming apparatus, the print jobs correspond to respective print job senders, the print job senders input user identification information to identify the print job senders when removing the print result objects from the record medium holding section, the print job managing section monitors the print result objects for correspondence with the print job senders, and when the print job managing section monitoring a print job corresponding to a particular print job sender, detects a print job sender who has removed a print result object of the print job from said record medium holding section and whose inputted user identification information does not match the user identification information of the particular print job sender, said print job managing section makes a predetermined notifying section make a notification.

In the case, the notification is a visual or audio notification. Further, the predetermined notifying section sends a mail to the particular print job sender.

Moreover, in the image forming apparatus, the print job managing section monitors an elapsed time that each print result object has been held in said record medium holding section, and when the elapsed time has exceeded an appointed time, makes a predetermined notifying section make a notification.

In the case, the print jobs correspond to respective print job senders, said print job managing section monitors a print result object of a print job corresponding to a particular print job sender, and when the elapsed time of the print result object has exceeded the appointed time, the predetermined notifying section sends a mail to the particular print job sender.

Moreover, in the image forming apparatus, the print job managing section receives a predetermined request, and outputs a message containing the print job management information for the print jobs of all print result objects currently held in said record medium holding section.

Moreover, in the image forming apparatus, the information processing apparatus receives a predetermined request, and designates either the printable record medium having the identification information section or other record medium so that an image is formed on the designated record medium.

Moreover, in the image forming apparatus, the identification information section is a tag capable of communicating with the image forming apparatus by using electromagnetic induction or an electric wave.

Further, according to the present invention, there is provided an image forming system, comprising:

The above-stated image forming apparatus and the above-stated information processing apparatus.

Furthermore, in the image forming apparatus, the print job managing in section, when the user identification information of the print job sender matches the user identification information of the particular print job sender, deletes the print job management information for the print job from the print job management information storing section.

The above and other objects and features of the present invention will become apparent from the following detailed description and the appended claims with reference to the accompanying drawings.

BRIEF DESCRIPTION OF THE DRAWINGS

FIG. 4 is an explanation drawing of print job management information in embodiment 1;

FIG. 6 is an explanation drawing of print job in embodiment 1;

DETAILED DESCRIPTION OF THE PREFERRED EMBODIMENTS

Embodiments of the invention will be described in detail hereinafter with reference to the drawings.

Embodiment 1

Figure 1:
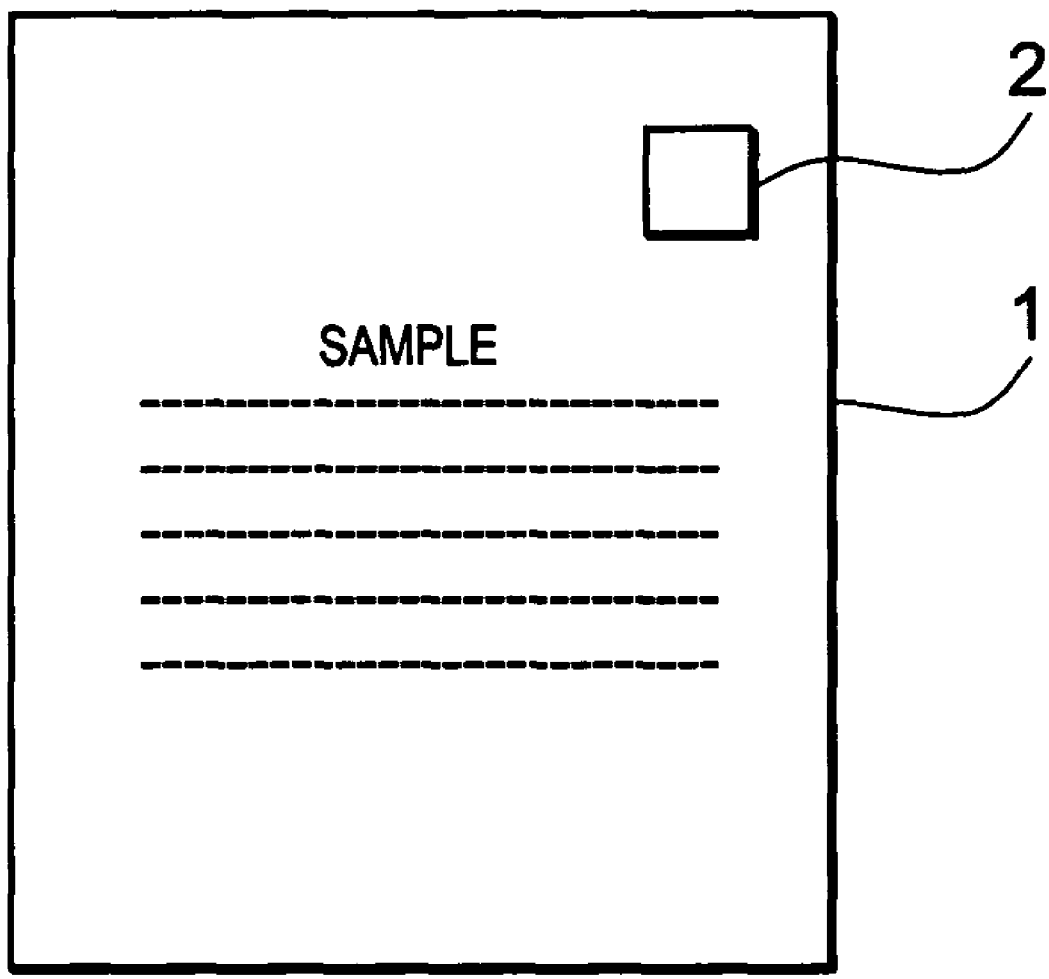
FIG. 1 is an illustration drawing of a record medium used in the present invention.

FIG. 1 is an illustration drawing of a record medium used in the present invention.

On record medium 1 used in the present invention, as shown by FIG. 1, IC tag 2 is provided. The record medium 1 may be a product with sheet shape for forming image, but has no limits on material and on form. It is well if only the record medium 1 is printable.

The IC tag 2 is a part for identifying the record medium 1 (hereinafter: print result object) which is outputted from an image forming apparatus and should be collected after the image is formed. The IC tag 2 may store management information, and may communicate by electromagnetic induction, that is, may communicate with the image forming apparatus by non-contact way. In the present invention, as an example, it is possible to use Radio Frequency Identification. Further, it is also possible to use other means.

Even if the IC tag 2 used in the present invention can be identified individually, it is unnecessary that the IC tag 2 have to store individual information. For example, the IC tag 2 may be provided with an element to emit a special frequency, thus the IC tag 2 can also be identified individually. Further, the IC tag 2 may be incorporated in advance into the record medium 1, and also may be added onto the record medium 1 by the image forming apparatus.

Figure 2:
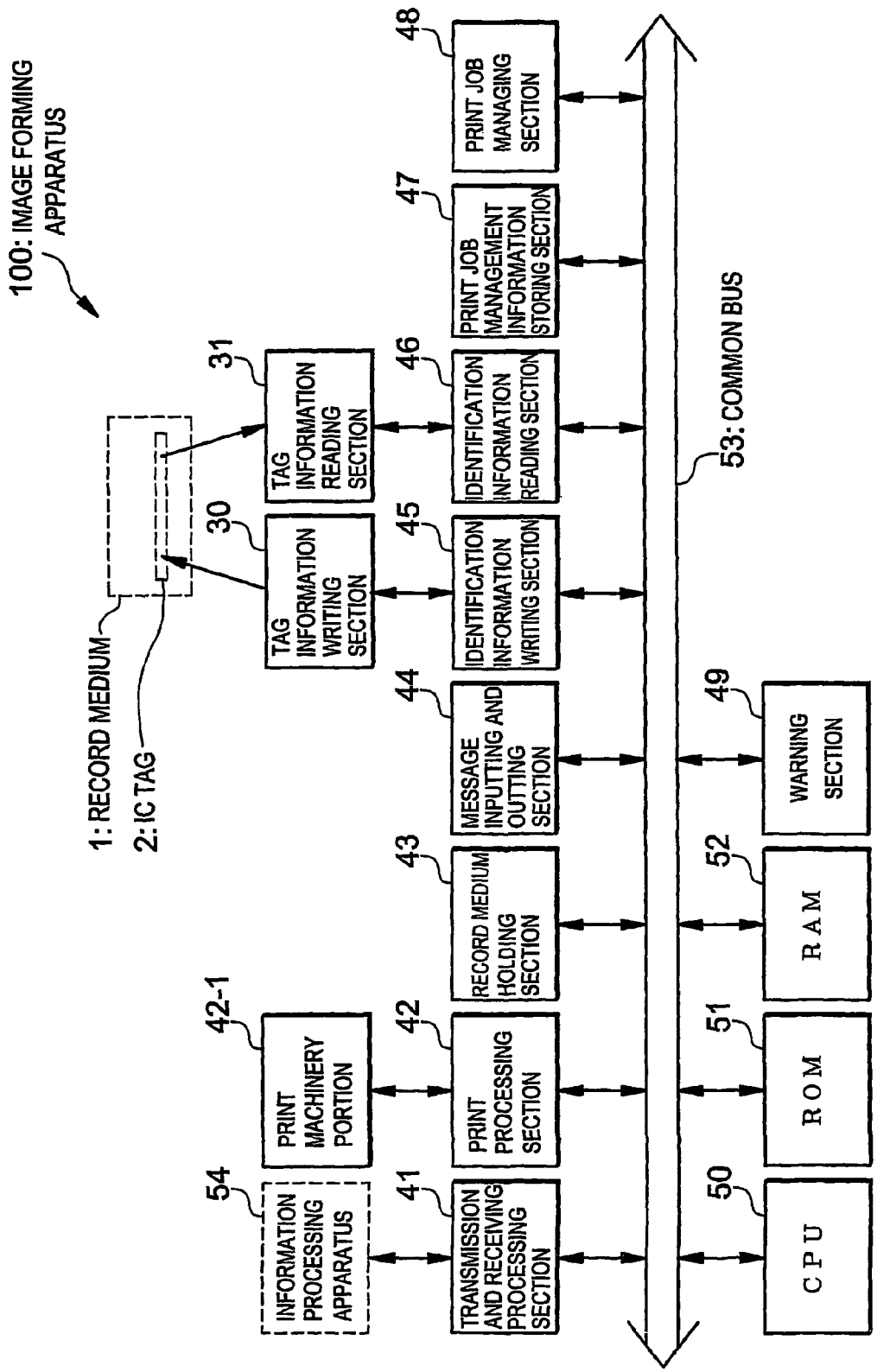
FIG. 2 is a functional block drawing of an image forming apparatus in embodiment 1.

FIG. 2 is a functional block drawing of an image forming apparatus in embodiment 1.

As shown by FIG. 2, an image forming apparatus 100 comprises a transmission and receiving processing section 41, a print processing section 42, a record medium holding section 43, a message inputting and outputting section 44, an identification information writing section 45, an identification information reading section 46, a print job management information storing section 47, a print job managing section 48, a warning section 49, a CPU 50, a ROM 51, a RAM 52 and a common bus 53.

The transmission and receiving processing section 41 is an interface part to communicatively connect with an information processing apparatus 54 via network (not shown). The image forming apparatus 100 receives a print job in which a print job management information is attached from the information processing apparatus 54 by the transmission and receiving processing section 41. Regarding the print job management information, it will be explained in the following description of the print job management information storing section 47.

The print processing section 42 is a part to change the received print job into print data, to control a print machinery portion 42-1 stated below and to output a print. The print processing section 42 is started by the CPU 50 to execute a predetermined control program previously stored in the ROM 51. The following is an explanation about the print machinery portion 42-1.

Figure 3:
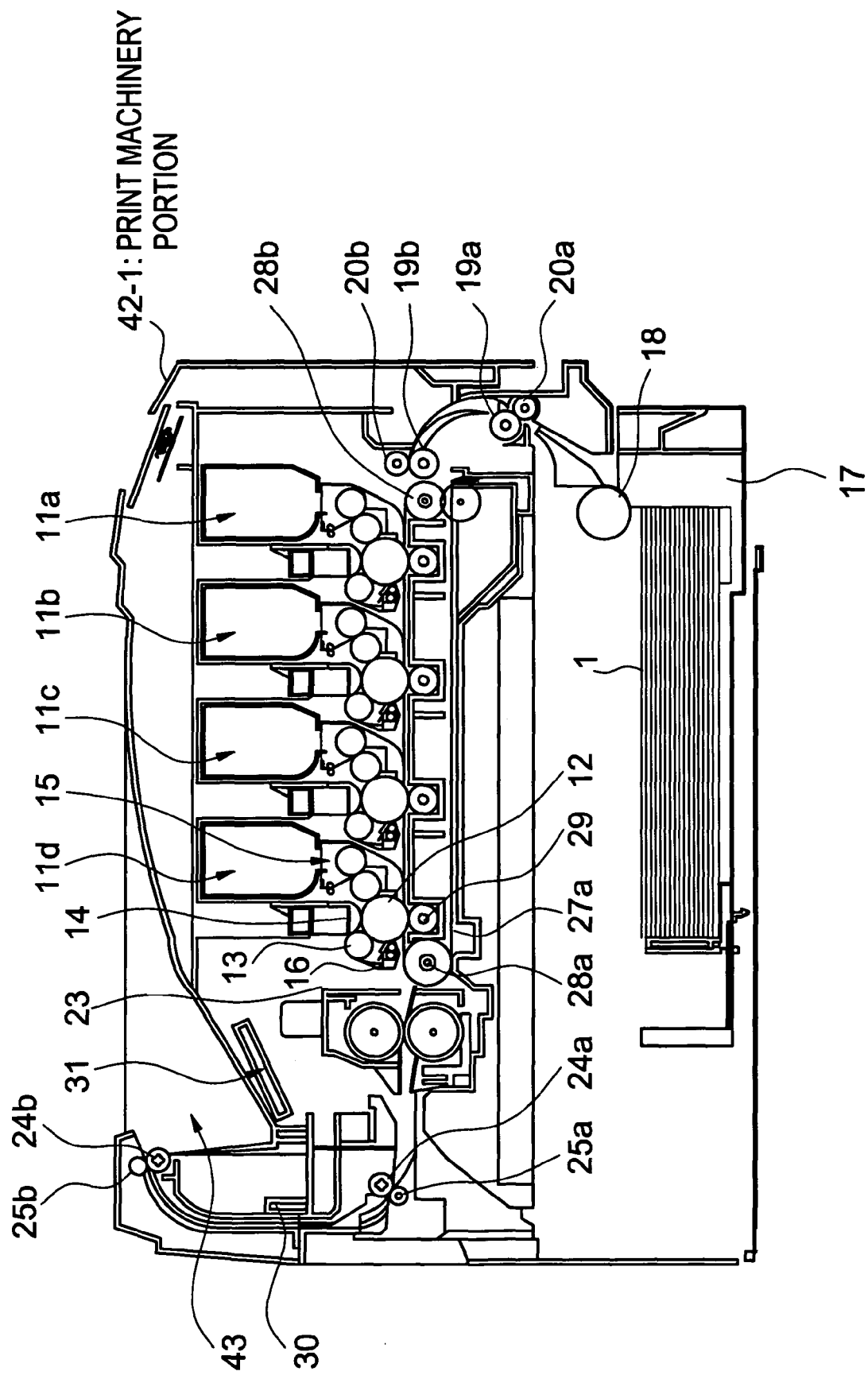
FIG. 3 is a summary structure drawing showing machinery part of an image forming apparatus in embodiment 1.

FIG. 3 is a summary structure drawing showing machinery part of an image forming apparatus in embodiment 1.

As shown by FIG. 3, the print machinery portion 42-1 of the image forming apparatus in the embodiment, includes process units 11a-11d for forming respective images of yellow, magenta, cyan and black. The process units 11a-11d are placed in tandem along a conveyance route of record medium and have respective image carrying bodies. The record medium 1 is sent from a sheet accommodating cassette 17 to accommodate the record medium 1 one by one, and is attracted to be conveyed along the conveyance route.

As shown by FIG. 3, in the four process units 11a-11d, respective photosensitive drums 12, respective charging units 13 placed on the circumference of the photosensitive drum 12, respective exposing units 14, developing units 15 and cleaning units 16 are provided. In each process unit, a static latent image formed on the photosensitive drum 12 by the exposing unit 14 becomes visible by the developing unit 15 having toners to correspond to respective colors.

The record medium 1 is taken out of the sheet accommodating cassette 17 installed in a bottom position of the image forming apparatus, one by one by a hoppling roller 18, and is provided to a conveyance belt 27 via registration rollers 19a and 19b. Moreover, the conveyance belt 27 holds the record medium 1 in a stretching state by a static force and conveys the record medium 1. Thereby, the record medium 1 is conveyed under the respective photosensitive drums 12 to sequentially pass under of the process units 11a-11d (in FIG. 3, from the right to the left).

The conveyance belt 27 is placed between a supporting roller 28a and a supporting roller 28b, the supporting rollers 28a and 28b are respectively driven by a driving source (not shown), and rotate with a same speed equal to the circumferential speed of the photosensitive drum 12 to convey the record medium 1. On the bottom places of respective photosensitive drums 12, respective transferring rollers 29 are mounted. Through the transferring roller 29, toner image on the photosensitive drum 12 is made to cling onto the record medium 1. Thus, through the process units 11a-11d, toner images with respective colors are repeated together on the record medium 1 to form an image.

Then, the record medium 1 is conveyed to a fixing unit 23. After the toner is fixed on the record medium 1 by the fixing unit 23, the record medium 1 is ejected to outside of the image forming apparatus by plural ejecting rollers 24a and 24b. Moreover, 20a, 20b, 25c and 25d are pinching rollers. Reference number 43 denotes a record medium holding section to accommodate print result object ejected. As a result, as stated above, an image is formed on the record medium 1 by the image forming apparatus.

Further, a tag information writing section 30 is an electromagnetic induction transmitter to communicate with the IC tag 2 added into the record medium 1 after the image is formed, and to write management information for identifying respective IC tags 2 (FIG. 1); a tag information reading section 31 is an electromagnetic induction receiver to read the written management information in the print result object which is being kept in the record medium holding section 43.

Figure 20:
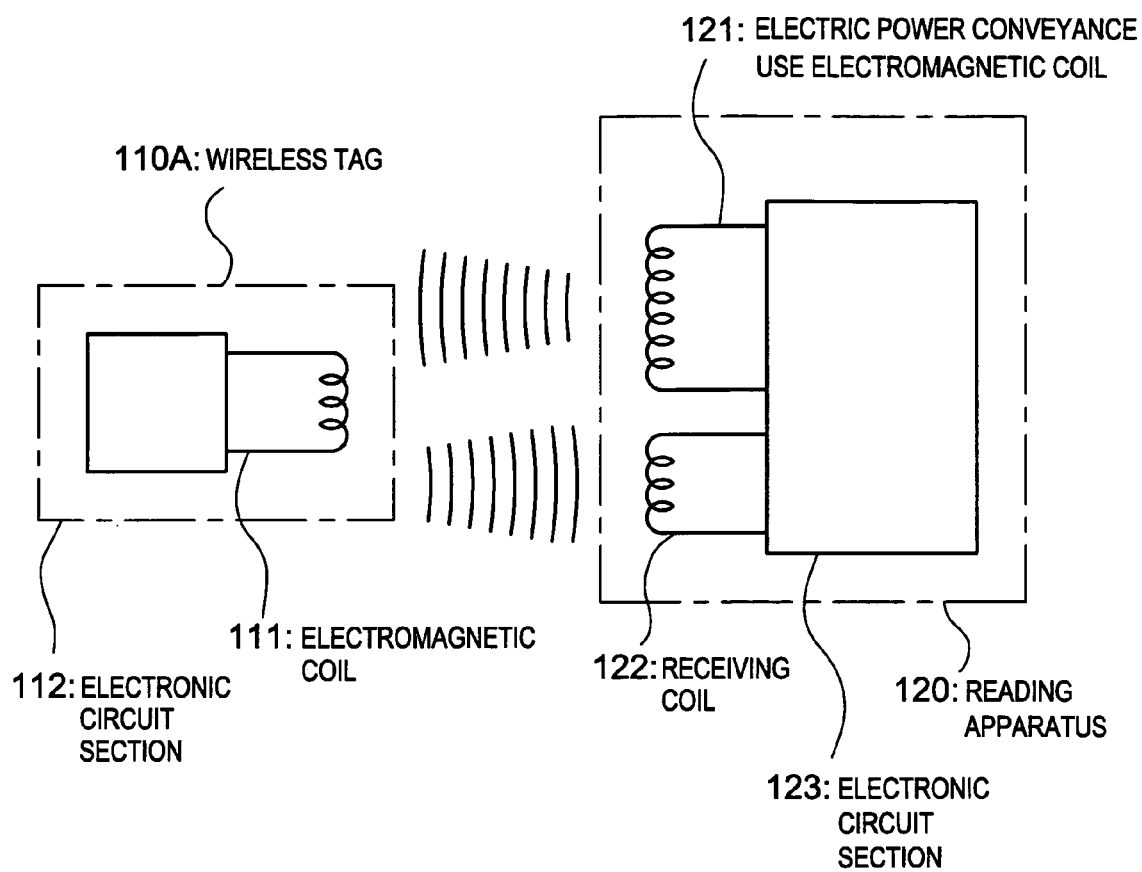
FIG. 20 is a block drawing showing an example of a general reading system for a wireless IC tag in embodiment.

Here, a general example of reading system for a wireless IC tag is explained by using FIG. 20.

FIG. 20 is a block drawing showing an example of a general reading system for a wireless IC tag in embodiments.

In the FIG. 20, 110A is a wireless IC tag, 120 is a reading apparatus used for the wireless tag 110A. The wireless tag 110A functionally comprises an electromagnetic coil 111 and an electronic circuit section 112 to process communication data. The reading apparatus 120 has an electric power conveyance use electromagnetic coil 121, a receiving coil 122 and an electronic circuit section 123.

The electromagnetic coil (electromagnetic induction coil) 111 has a function as an antenna of data communication. Thus, when the wireless tag 110A enters an area capable of communicate with the reading apparatus 120, the electronic circuit section 112 operates to obtain necessary electric power from the reading apparatus 120 by wireless communication (by an electromagnetic wave), and to output previously stored record data to the reading apparatus 120 by wireless communication. The electronic circuit section 112 is to control respective processes in the cases of data storage, data transfer, data processing, and data communication with external devices (reading apparatus 120).

The electric power conveyance use electromagnetic coil 121 is to provide electric power by an electromagnetic wave in order to make the electronic circuit section 112 of the wireless tag 110A receive electric power and operate. The receiving coil 122 is to receive data sent from the wireless tag 110A through the electronic circuit section 112. The electronic circuit section 123 is to control operations of the electric power conveyance use electromagnetic coil 121 and the receiving coil 122, and is to collectively control data communication with the wireless tag 110A. The electronic circuit section 123 executes respective processes such as transmission of electric power used for the wireless tag 110A, analysis of data received from the wireless tag 110A, and the like. Moreover, the electromagnetic coil 121 and, the receiving coil 122 may be made in common.

Following is to end the summary explanation of the above part, to return FIG. 1 to continuously explain the structure of image forming apparatus.

The record medium holding section 43, as stated in the summary explanation of the print machinery portion 42-1 (FIG. 3), is a part to keep print result object that results from executing a print job received from the transmission and receiving processing section 41. Here, the print result object means the record medium outputted from the image forming apparatus 100 with an image printed thereon.

The message inputting and outputting section 44 is a part to serve an operator of the image forming apparatus as a man-machine interface to, while he/she attempts to collect the print result object, to input owner information indicating a sender (operator) who has sent the print job, by using displaying plate or switch (not shown); and to display a caution to the sender.

The identification information writing section 45 is a part to control the tag information writing section 30 (FIG. 3), and to write print job management information managed by the print job management information storing section 47 into the IC tag 2 of the record medium 1. The identification information writing section 45 is driven through the CPU 50 executes predetermined control program previously stored in the ROM 51.

The identification information reading section 46 is a part to control the tag information reading section 31 (FIG. 3), and to read the print job management information from the IC tag 2 of the record medium 1 kept in the record medium holding section 43. The identification information reading section 46 is driven through the CPU 50 executes a predetermined control program previously stored in the ROM 51.

The print job management information storing section 47 is a memory to store print job management information. In general, the print job management information storing section 47 is constructed by using a part of memorizing area of RAM 52. However, in the case to manage print process over a long period, the print job management information storing section 47 is constructed by non-volatile memory.

Next, the print job management information will be explained.

FIG. 4 is an explanation drawing of print job management information in embodiment 1.

As shown by FIG. 4, three items of print job name, password and management information are set, and a record consisting of the print job name, the password and the management information regarding a print job is stored sequentially according to a receiving order of the print job. The print job name, the password and the management information which construct the print job management information, have been added into the print job and have been sent by the information processing apparatus 54.

To return FIG. 2, the print job managing section 48 is a part to obtain the print job management information from the print job to which the print job management information received by the transmission and receiving processing section 41 has been added; to take out necessary information for management of the print job such as the print job name, the password, the management information and the like; to assign the necessary information to respective record mediums 1, and to write the necessary information into the print job management information storing section 47 as the print job management information (FIG. 4). The print job managing section 48 is also a part to execute an individual identification of an operator on the basis of the sender information inputted into the message inputting and outputting section 44 by the operator while the operator attempts to collect the print result object. Further, the print job managing section 48 is also a part to periodically monitor the print result objects held in the record medium holding section 43. The print job managing section 48 is driven through the CPU 50 executes a predetermined control program previously stored in the ROM 51.

The warning section 49 is a part to warn by using the message inputting and outputting section 44 when an operator of the image forming apparatus 100 mistakenly collects a print result object of which the print job the operator has not sent, and to notify the operator of his/her mistake via visual sensation or hearing sensation. Here, it is possible to include the cases of unique visual sensation, unique hearing sensation, and both of visual sensation and hearing sensation. In the case of unique visual sensation, it is possible to notify by displaying a content indicating the collection is mistake on a displaying screen such as an LED or the like; in the case of unique hearing sensation, it is possible to mount a speaker onto the image forming apparatus 100 to send a warning. The warning section 49 is driven through the CPU 50 executes a predetermined control program previously stored in the ROM 51.

The CPU 50 is a micro processor to control the whole apparatus by executing predetermined control program previously stored in the ROM 51, and is a part to drive general image formation functions (its explanation is omitted). Further, in the embodiment, through executing predetermined control program previously stored in the ROM 51, the CPU 50 drives the above-stated transmission and receiving processing section 41, the print processing section 42, the identification information writing section 45, the identification information reading section 46, the print job managing section 48 and the warning section 49.

The ROM 51 is a read only memory to store a predetermined control program for driving general image formation functions and to execute the control program through the CPU 50. Further, in the embodiment, the ROM 51 is also a read only memory to store a control program to drive the above-stated transmission and receiving processing section 41, the print processing section 42, the identification information writing section 45, the identification information reading section 46, the print job managing section 48 and the warning section 49, and to execute the control program through the CPU 50.

The RAM 52 is a random access memory to form an arithmetic process area needed when the CPU 50 executes the control program.

The common bus 53 is a bus to connect respective compositions.

The following is to explain operations of image forming apparatus in the embodiment.

Figure 5:
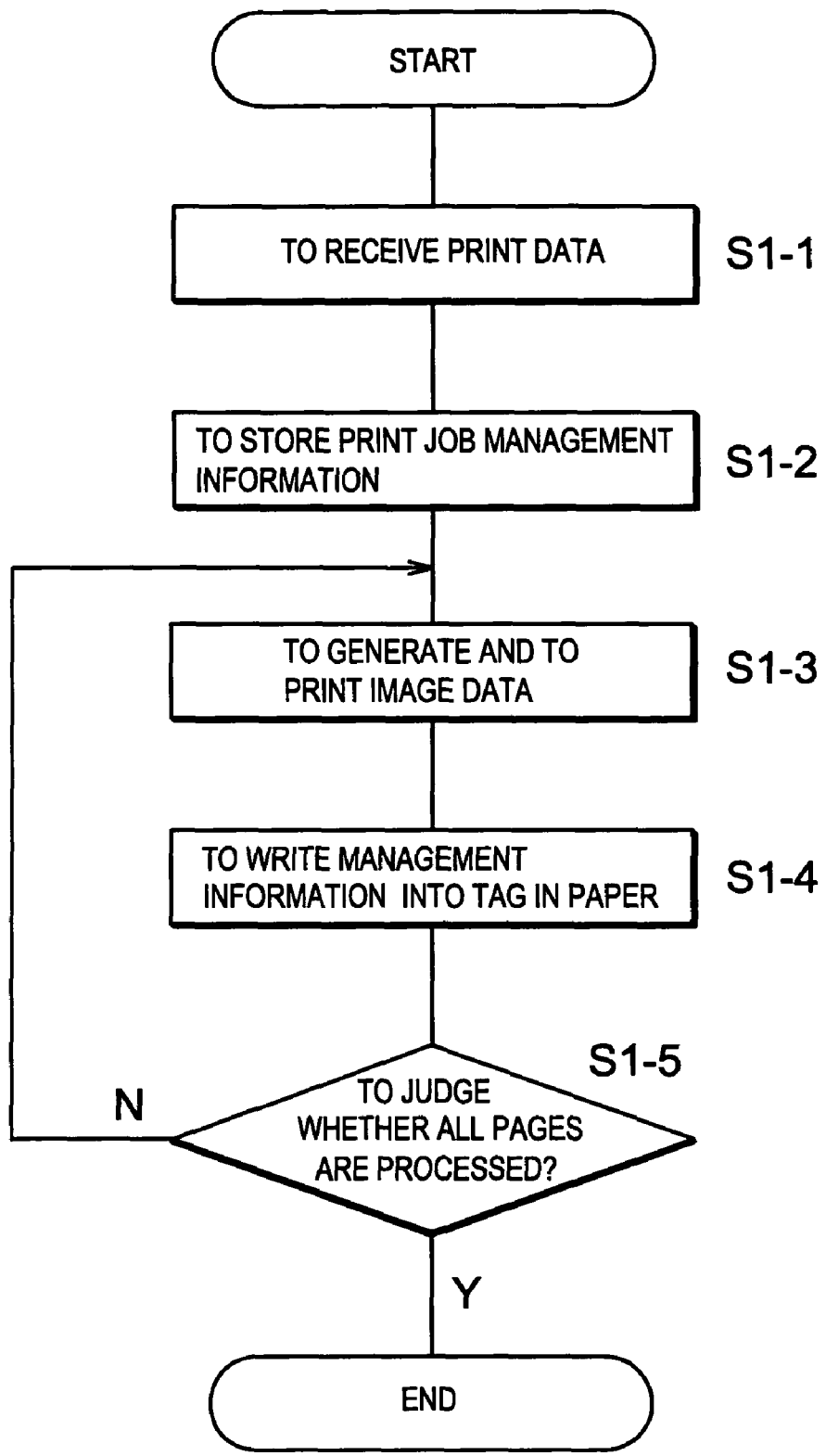
FIG. 5 is a flowchart of print process of an image forming apparatus in embodiment 1.

FIG. 5 is a flowchart of print process of an image forming apparatus in embodiment 1.

The FIG. 5 is a flowchart to explain a flow from an operation that the transmission and receiving processing section 41 (FIG. 2) receives a print job to which print job management information has been added from the information processing apparatus 54 (FIG. 2), to an operation that the print processing section 42 (FIG. 2) ends the print of all pages. According to the step order from step S1-1 to step S1-5, the operations will be explained.

Step S1-1:

The transmission and receiving processing section 41 (FIG. 2) receives a print job to which print job management information is added from the information processing apparatus 54. Here, an example of print job is explained.

FIG. 6 is an explanation drawing of print job in embodiment 1.

As shown by FIG. 6, in the received print job, a job name, a user name, a password are added into print data.

To return FIG. 5, the explanation of the print process flowchart of the image forming apparatus in the embodiment is continued.

Step S1-2:

The print job managing section 48 (FIG. 2) obtains the job name, the user name, and the password from the print job (FIG. 6) received by the transmission and receiving processing section 41 (FIG. 2), and stores them into the print job management information storing section 47 as print job management information (FIG. 2).

Step S1-3:

The print processing section 42 (FIG. 2) changes the received print job into the print data, and controls the print machinery portion 42-1 (FIG. 3) explained in FIG. 3 to perform print process.

Step S1-4:

The identification information writing section 45 (FIG. 2) controls the tag information writing section 30, and writes the print job management information managed by the print job management information storing section 47 (FIG. 2) into the IC tag 2 of the record medium 1 (FIG. 1) by using electromagnetic induction.

Step S1-5:

The step S1-3 to step S1-5 are repeated until processing of all pages ends. When the processing of all pages ends, the flow ends.

Figure 7:
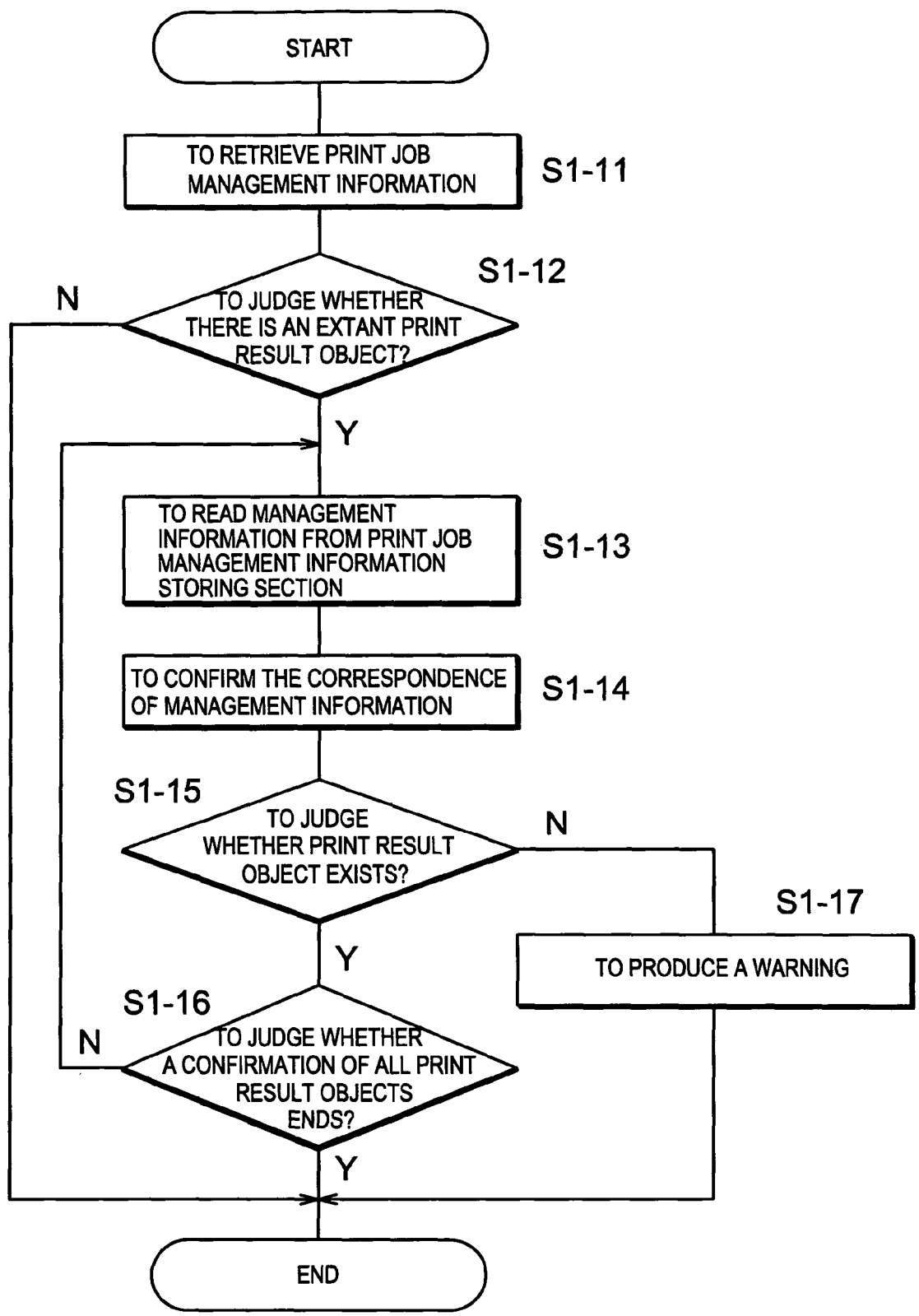
FIG. 7 is a flowchart of print job surveillance process of an image forming apparatus in embodiment 1.

FIG. 7 is a flowchart of print job surveillance process of an image forming apparatus in embodiment 1.

The image forming apparatus 100 monitors a print result object kept in the record medium holding section 43 (FIGS. 2 and 3) by reading a tag information in the print result object in a fixed cycle so as to prevent an operator who is not formally identified yet from taking the print result object away. The monitoring cycle is desired to be very short so as to immediately detect that the unidentified operator has taken away the print result object from the record medium holding section 43 (FIGS. 2 and 3). According to the step order from step S1-11 to step S1-17, the operations will be explained.

Step S1-11:

The print job managing section 48 retrieves print job management information stored in the print job management information storing section 47.

Step S1-12:

The print job managing section 48 (FIG. 2), by using the retrieved print job management information, judges whether any print result object should remain in the record medium holding section 43 (FIGS. 2 and 3). If the print job managing section 48 judges that no print result object remains, the flow ends; if the print job managing section 48 judges that some print result object should remain, the flow enters step S1-13.

Step S1-13:

The print job managing section 48 (FIG. 2) reads out a record of the extant management information from the print job management information storing section 47 (FIG. 2).

Step S1-14:

The print job managing section 48 (FIG. 2) communicates with the IC tags 2 of all print result objects remaining in the record medium holding section 43 (FIGS. 2 and 3) via the identification information reading section 46 (FIGS. 2 and 3), and confirms whether a print result object having the tag information (management information) corresponding to the record of the extant management information exists.

Step S1-15:

In the case that the print result object having the tag information (management information) corresponding to the record of the extant management information exists, the process enters step S1-16; in the case that the print result object having the tag information (management information) corresponding to the record of the extant management information does not exist, the process enters step S1-17.

Step S1-16:

The print job managing section 48 (FIG. 2) repeats the steps from S1-13 to S1-16 if the confirmation does not end yet about all records of the extant management information indicating that the corresponding print result objects should remain; if the confirmation of all records of the extant management information ends, the flow ends.

Step S1-17:

The print job managing section 48 (FIG. 2) judges that an operator of the image forming apparatus 100 mistakenly collects the print result object of which the print job the operator has not sent if the confirmation can not be performed about all the records of the extant management information indicating that the print result object should remain. The warning section 49 displays a warning message on the message inputting and outputting section 44 (FIG. 2) on the basis of the judgment of the print job managing section 48 (FIG. 2), and the flow ends.

Figures 8, 10:
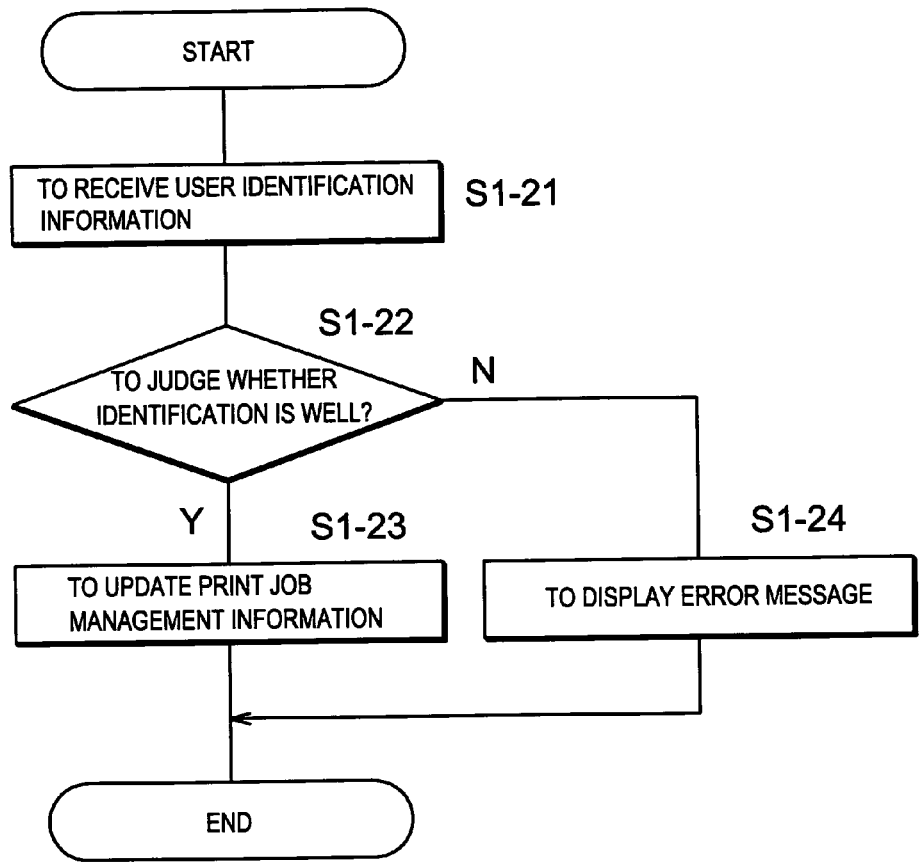
FIG. 8 is a flowchart of print job collection process of an image forming apparatus in embodiment 1.
FIG. 10 is an explanation drawing of print job management information in embodiment 2.

FIG. 8 is a flowchart of print job collection process of an image forming apparatus in embodiment 1.

The drawing is a flowchart to explain operations while an operator who has sent a print job collects the corresponding print result object of the print job from the record medium holding section 43 (FIGS. 2 and 3). According to the step order from step S1-21 to step S1-24, the operations will be explained.

Step S1-21:

The print job managing section 48 (FIG. 2) receives a print job name and a password from the operator via the message inputting and outputting section 44 (FIG. 2).

Step S1-22:

In the case that the print job name and the password inputted by the operator can be collated with the print job management information stored in the print job management information storing section 47 (FIG. 2), the print job managing section 48 (FIG. 2) enters step S1-23; in the case that the print job name and the password inputted by the operator can not be collated with the print job management information stored in the print job management information storing section 47 (FIG. 2), the print job managing section 48 (FIG. 2) enters step S1-24.

Step S1-23:

The print job managing section 48 (FIG. 2) deletes the corresponding print job management information from the print job management information storing section 47 (FIG. 2) and ends the flow. Then, the corresponding print job management information is excluded from monitored objects.

Step S1-24:

The print job managing section 48 (FIG. 2) displays a message indicating content that the identification with respect to the user failed onto the message inputting and outputting section 44 (FIG. 2) via the CPU 50 (FIG. 2), and ends the flow.

As stated in the above, according to the embodiment, it is possible to obtain such effects as preventing that an operator who has sent a print job collects a print result object of which the print job the operator has not sent, or that on the contrary, a print result object is taken away by an operator who has not sent the print job of the print result object, from the record medium holding section. Further, through a short setting of the cycle of monitoring process, when an operator of the image forming apparatus mistakenly collects a print result object of which the print job the operator has not sent, a warning is sent, so as to make the sender of the print job aware of the mistake.

Embodiment 2

In the above stated embodiment 1, when a print result object is mistakenly taken away by an operator who has not sent the print job of the print result object, a message is displayed on the message inputting and outputting section 44 to warn the sender of the print job. However, in the embodiment 2, to replace the above stated warning section, a warning mail notifying section is provided, so that the warning mail notifying section sends a mail to the sender of the print job to provide the warning. Therefore, in the embodiment, mail address is added to the print job management information by the information processing apparatus.

Figure 9:
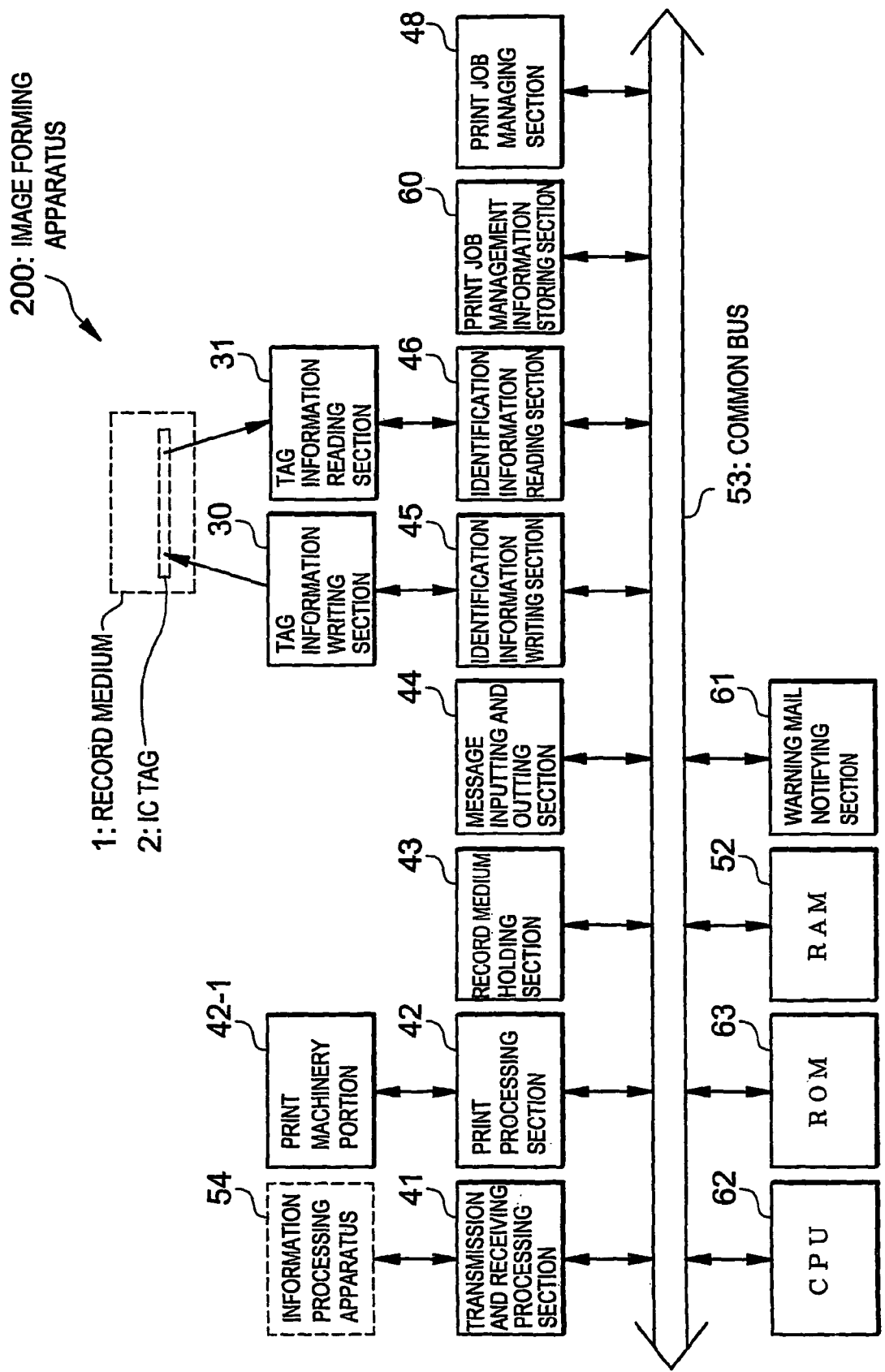
FIG. 9 is a functional block drawing of an image forming apparatus in embodiment 2.

FIG. 9 is a functional block drawing of an image forming apparatus in embodiment 2.

As shown by FIG. 9, the image forming apparatus 200 comprises a transmission and receiving processing section 41, a print processing section 42, a record medium holding section 43, a message inputting and outputting section 44, an identification information writing section 45, an identification information reading section 46, a print job managing section 48, a print job management information storing section 60, a warning mail notifying section 61, a CPU 62, a ROM 63 and a common bus 53. In the following, only the part different from the embodiment 1 is explained, while the same part as the embodiment 1 have the same reference number, and its explanation is omitted.

The print job management information storing section 60 is a memory to store the print job management information. In general, the print job management information storing section 60 is constructed by using a part of memorizing area of RAM 52. However, in the case to manage print process over a long period, the print job management information storing section 60 is constructed by a non-volatile memory.

Next, the print job management information used in the embodiment 2 will be explained.

FIG. 10 is an explanation drawing of print job management information in embodiment 2.

As shown by FIG. 10, four items (for example) of print job name, mail address (of the sender of a print job), password and management information are set, and a record consisting of the print job name, the mail address (of the sender of the print job), the password and the management information is stored sequentially from upper (in the drawing) according to a order of receiving the print job. The print job name, the mail address, the password and the management information which construct the print job management information, have been added into the print job and have been sent by the information processing apparatus 54.

Returning to FIG. 9, the warning mail notifying section 61 is a part to create, when an operator of the image forming apparatus 100 mistakenly collects a print result object of which the print job the operator has not sent, make a message indicating the collection mistake, and to send the message to the sender of the print job via mail. The warning mail notifying section 61 is driven through the CPU 62 executing a predetermined control program previously stored in the ROM 63.

The CPU 62 is a micro processor to control the whole apparatus by executing predetermined control program previously stored in the ROM 63, and is a part to drive general image formation functions (its explanation is omitted). Further, in the embodiment, through executing predetermined control program previously stored in the ROM 63, the CPU 62 drives the above-stated transmission and receiving processing section 41, the print processing section 42, the identification information writing section 45, the identification information reading section 46, the print job managing section 48 and the warning mail notifying section 61.

The ROM 63 is a read only memory to store a predetermined control program for driving general image formation functions and to execute the control program through the CPU 62. Further, in the embodiment, the ROM 63 is also a read only memory to store a control program to drive the above-stated transmission and receiving processing section 41, the print processing section 42, the identification information writing section 45, the identification information reading section 46, the print job managing section 48 and the warning mail notifying section 61, and to execute the control program through the CPU 62. Regarding other parts of this embodiment, because it is the same as embodiment 1, its explanation is omitted.

The following is to explain operations of image forming apparatus in the embodiment.

Figure 11:
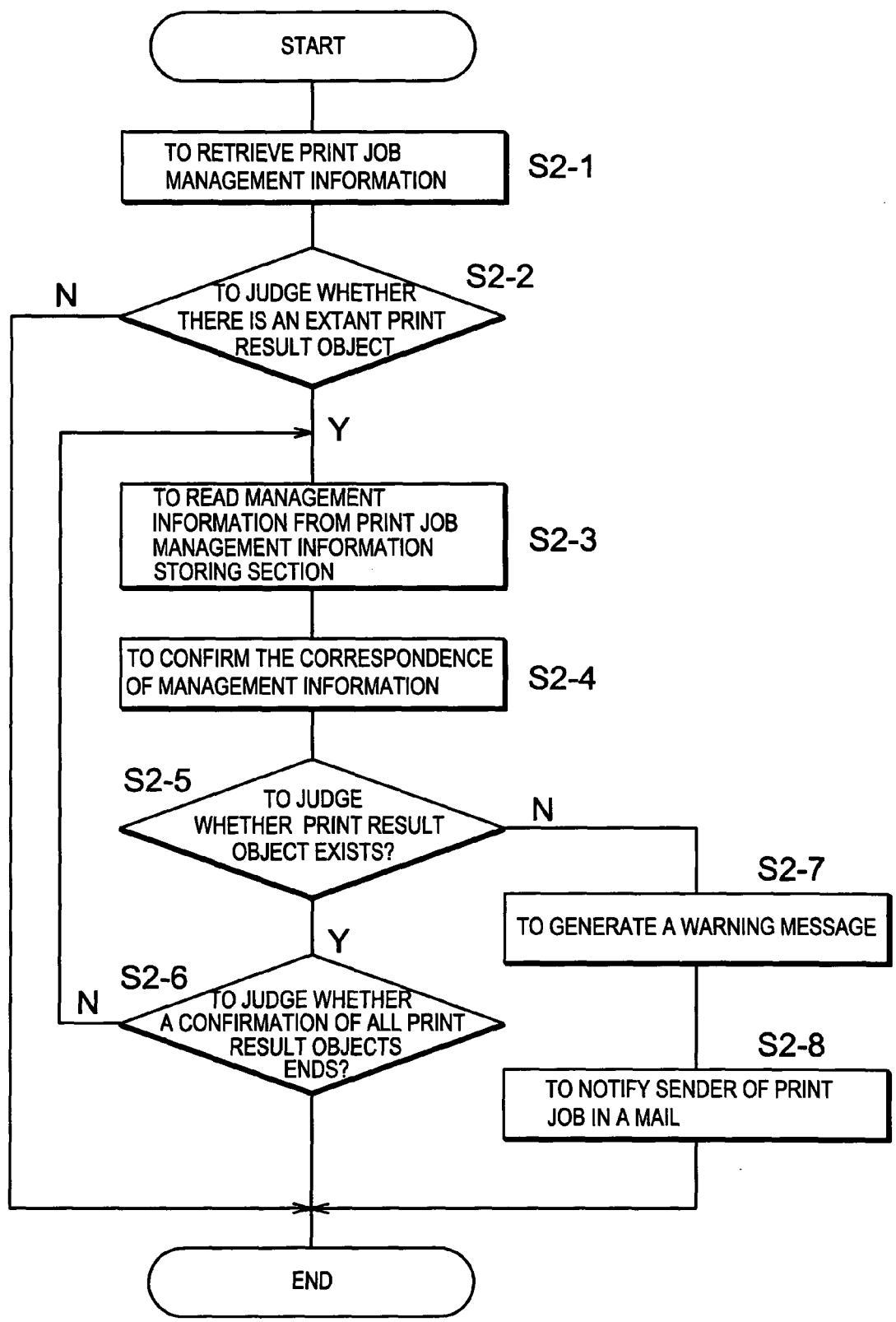
FIG. 11 is a flowchart of print job surveillance process of an image forming apparatus in embodiment 2.

FIG. 11 is a flowchart of print job surveillance process of an image forming apparatus in embodiment 2.

The image forming apparatus 200 monitors a print result object kept in the record medium holding section 43 (FIGS. 9 and 3) by reading a tag information in the print result object in a fixed cycle so as to prevent an operator who is not formally identified yet from taking the print result object away. The monitoring cycle is desired to be very short so as to immediately detect that the unidentified operator has taken away the print result object from the record medium holding section 43 (FIGS. 9 and 3). According to the step order from step S2-1 to step S2-8, the operations will be explained.

Step S2-1:

The print job managing section 48 retrieves print job management information stored in the print job management information storing section 60 (FIG. 9).

Step S2-2:

The print job managing section 48 (FIG. 9), by using the retrieved print job management information, and judges whether any print result object should remain in the record medium holding section 43 (FIGS. 9 and 3). If the print job managing section 48 judges that no print result object remains, the flow ends; if the print job managing section 48 judges that some print result object should remain, the flow enters step S2-3.

Step S2-3:

The print job managing section 48 (FIG. 9) reads out a record of the extant management information from the print job management information storing section 60 (FIG. 9).

Step S2-4:

The print job managing section 48 (FIG. 9) communicates with the IC tags 2 (FIG. 1) of all print result objects remaining in the record medium holding section 43 (FIGS. 9 and 3) via the identification information reading section 46 (FIGS. 9 and 3), and confirms whether a print result object having the tag information (management information) corresponding to the record of the extant management information exists.

Step S2-5:

In the case that the print result object having the tag information (management information) corresponding to the record of the extant management information exists, the process enters step S2-6; in the case that the print result object having the tag information (management information) corresponding to the record of the extant management information does not exist, the process enters step S2-7.

Step S2-6:

The print job managing section 48 (FIG. 9) repeats the steps from S2-3 to S2-6 if the confirmation does not end yet about all records of the extant management information indicating that the corresponding print result objects should remain; if the confirmation of all records of the extant management information ends, the flow ends.

Step S2-7:

The print job managing section 48 (FIG. 9) judges that an operator of the image forming apparatus 100 mistakenly collects the print result object of which the print job the operator has not sent if the confirmation can not be performed about all the records of the extant management information indicating that the print result object should remain. The warning mail notifying section 61 (FIG. 9) makes a warning message on the basis of the judgment of the print job managing section 48 (FIG. 9).

Step S2-8:

The warning mail notifying section 61 (FIG. 9) sends the warning message to the sender of the print job via mail (i.e. an e-mail). Then, the flow ends.

As stated in the above, according to the embodiment, to add the effect of embodiment 1, because the sender of the print job of which the print result object has been collected by an operator who has not sent the print job, is notified via mail, it is further possible that a notification to the sender of the print job becomes confirmed.

Embodiment 3

In the embodiment, the image forming apparatus is provided with a clock (timer), a print process end time is recorded, after the print process, if a collection is not done even if an appointed time has passed, a notification is sent to the corresponding sender of the print job via mail indicating that a collection is requested.

Figure 12:
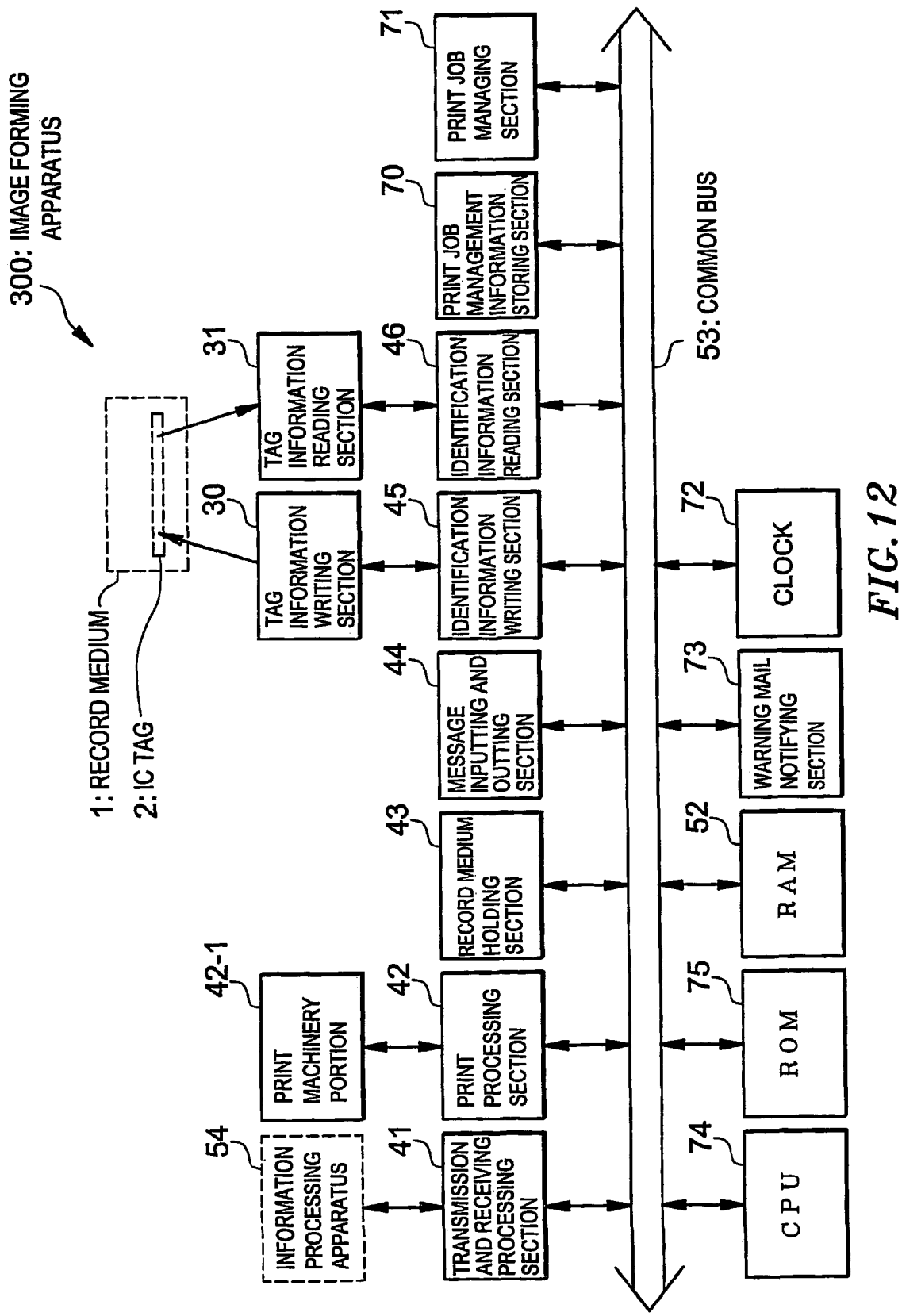
FIG. 12 is a functional block drawing of an image forming apparatus in embodiment 3.

FIG. 12 is a functional block drawing of an image forming apparatus in embodiment 3.

As shown by FIG. 12, the image forming apparatus 300 comprises a transmission and receiving processing section 41, a print processing section 42, a record medium holding section 43, a message inputting and outputting section 44, an identification information writing section 45, an identification information reading section 46, a RAM 52, a print job management information storing section 70, a print job managing section 71, a clock 72, a warning mail notifying section 73, a CPU 74, a ROM 75 and a common bus 53. In the following, only the part different from the embodiment 2 is explained, while the same part as the embodiment 2 has the same reference number, and its explanation is omitted.

The print job management information storing section 70 is a memory to store the print job management information. In general, the print job management information storing section 70 is constructed by a non-volatile memory.

Next, the print job management information used in the embodiment 3 will be explained.

Figures 13, 14:
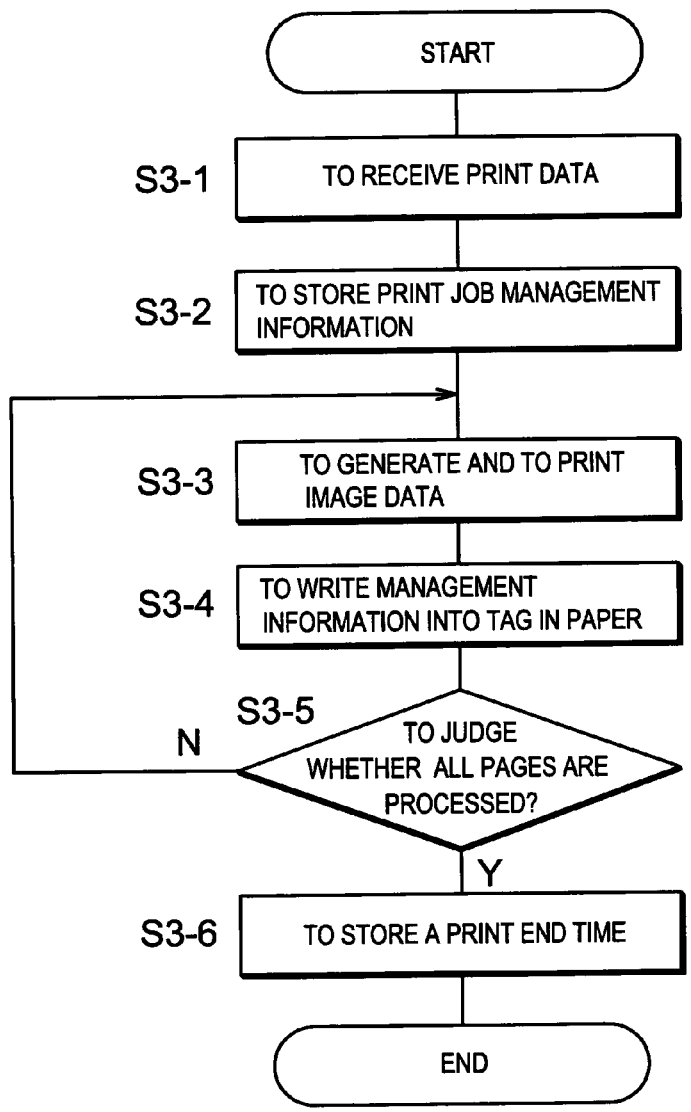
FIG. 13 is an explanation drawing of print job management information in embodiment 3.
FIG. 14 is a flowchart of print process of an image forming apparatus in embodiment 3.

FIG. 13 is an explanation drawing of print job management information in embodiment 3.

As shown by FIG. 13, five items (for example) of print job name, mail address, password, print end time and management information are set, and a record consisting of the print job name, the mail address (of the sender of a print job), the password, the print end time and the management information is stored sequentially from upper (in the drawing) according to a receiving order of the print job. The print job name, the mail address, the password, the print end time and the management information which construct the print job management information, have been added into the print job, further have been sent by the information processing apparatus 54. The print end time is stored after the print of the print job ends, through the print job managing section 71 monitoring the clock 72.

The print job managing section 71 is a part to obtain print job management information from a print job to which the print job management information received by the transmission and receiving processing section 41 has been added; to take out necessary information for management of the print job such as the print job name, the password, the management information and the like; to assign the necessary information to respective record mediums 1, and to write the necessary information into the print job management information storing section 70 as the print job management information. The print job managing section 71 is also a part to execute an individual identification of an operator on the basis of sender information inputted into the message inputting and outputting section 44 while the operator attempts to collect the print result object.

Further, the print job managing section 71 is also a part to monitor a print result object held in the record medium holding section 43 in a fixed cycle. Moreover, the print job managing section 71 is also a part to monitor the clock 72 and to store the print end time into the print job management information storing section 70. Furthermore, the print job managing section 71 is also a part to measure an elapsed time that the print result object has been kept in the record medium holding section 43 per the fixed cycle to monitor the print result object in the record medium holding section 43. The print job managing section 71 is driven through the CPU 74 executes a predetermined control program previously stored in the ROM 74.

The clock 72 is a clock for measure the elapsed time.

The warning mail notifying section 73 is a part to, when a print result object is mistakenly collected by an operator who has not sent the print job of the print result object, make a message indicating the collection mistake, and to send the message to the sender of the print job via mail. Further, the warning mail notifying section 73 is a part to, in the case that the print result object is stored in the record medium holding section 43 over an appointed time, make a message indicating the condition and to notify the sender who sent the print job via mail. The warning mail notifying section 73 is driven through the CPU 74 executes a predetermined control program previously stored in the ROM 75.

The CPU 74 is a micro processor to control the whole apparatus by executing predetermined control program previously stored in the ROM 75, and is a part to drive general image formation functions (its explanation is omitted). Further, in the embodiment, through executing predetermined control program previously stored in the ROM 75, the CPU 74 drives the above-stated transmission and receiving processing section 41, the print processing section 42, the identification information writing section 45, the identification information reading section 46, the print job managing section 71 and the warning mail notifying section 73.

The ROM 75 is a read only memory to store a predetermined control program for driving general image formation functions and to execute the control program through the CPU 74. Further, in the embodiment, the ROM 75 is also a read only memory to store a control program to drive the above-stated transmission and receiving processing section 41, the print processing section 42, the identification information writing section 45, the identification information reading section 46, the print job managing section 71 and the warning mail notifying section 73, through the CPU 74 executes it. Regarding other part, because it is the same as embodiment 2, its explanation is omitted.

Following is to explain operations of image forming apparatus in the embodiment.

FIG. 14 is a flowchart of print process of an image forming apparatus in embodiment 3.

The drawing is a flowchart to explain a flow from an operation that the transmission and receiving processing section 41 (FIG. 12) receives print job to which print job information has been added from the information processing apparatus 54 (FIG. 12), to an operation that the print processing section 42 (FIG. 12) ends the print of all pages. According to the step order from step S3-1 to step S3-6, the operations are explained.

Step S3-1:

The transmission and receiving processing section 41 (FIG. 12) receives a print job to which print job management information is added from the information processing apparatus 54. Here, in the received print job, the print name, the password, the mail address and the like, as the print job management information are contained and are added in the print data.

Step S3-2:

The print job managing section 71 (FIG. 12) obtains the job name, the password and the mail address from the print job (FIG. 6) received by the transmission and receiving processing section 41 (FIG. 12), and stores them into the print job management information storing section 70 as print job management information (FIG. 12).

Step S3-3:

The print processing section 42 (FIG. 12) changes the received print job into the print data, and controls the print machinery portion 42-1 (FIG. 3) explained in FIG. 3 to perform print process.

Step S3-4:

The identification information writing section 45 (FIG. 12) controls the tag information writing section 30 (FIG. 3), and writes the print job management information managed by the print job management information storing section 70 (FIG. 12) into the IC tag 2 of the record medium 1 (FIG. 1) by using electromagnetic induction.

Step S3-5:

The step S1-3 to step S1-5 are repeated till process of all pages ends. When the process of all pages ends, the flow enters the next.

Step S3-6:

The print job managing section 71 (FIG. 12) obtains a print (process) end time of all pages from the clock 72 (FIG. 12), and stores the print end time into the print job management information storing section 70 (FIG. 12). Then, the flow is ends.

Figure 15:
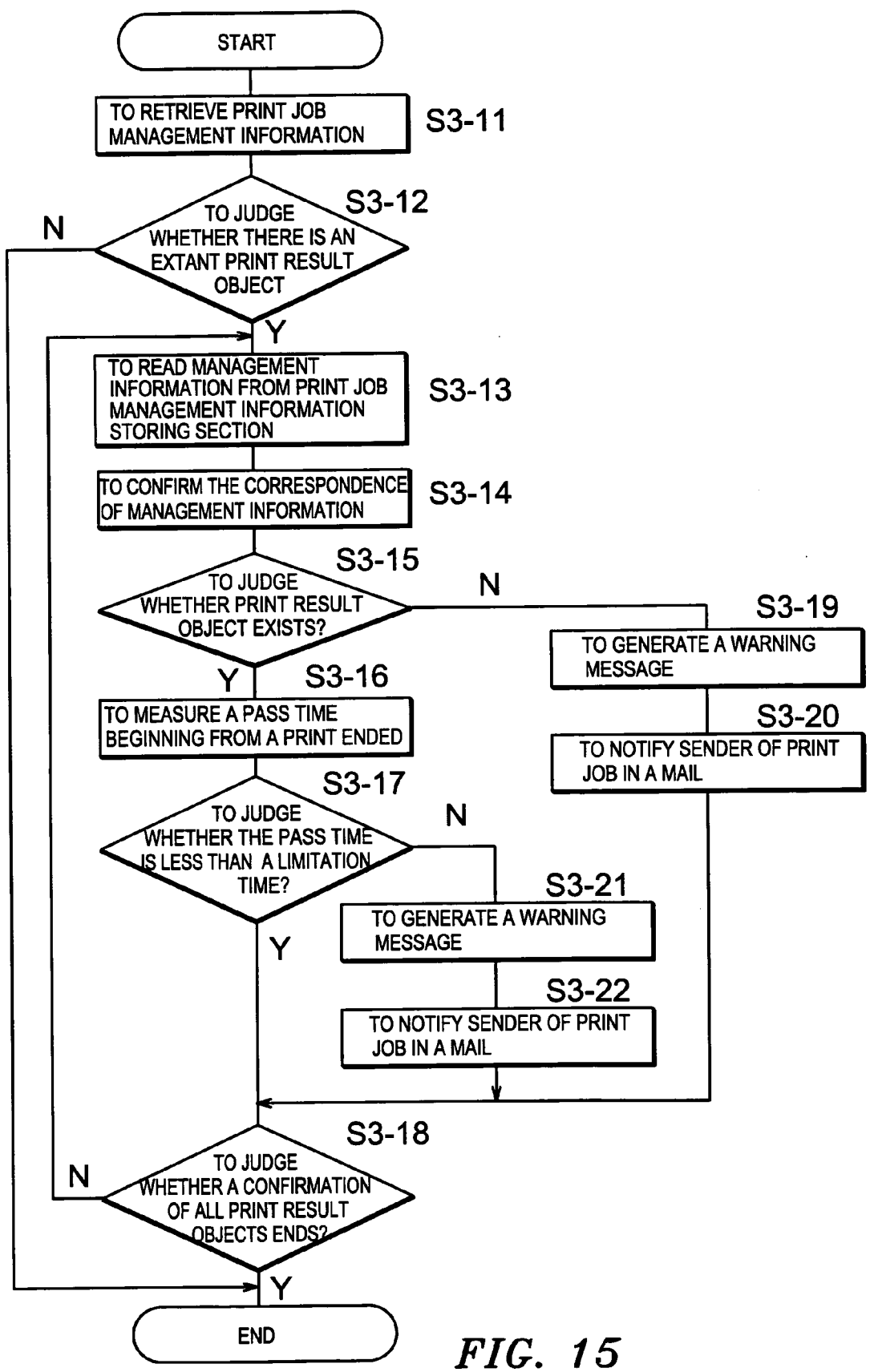
FIG. 15 is a flowchart of print job surveillance process of an image forming apparatus in embodiment 3.

FIG. 15 is a flowchart of print job surveillance process of an image forming apparatus in embodiment 4.

The image forming apparatus 300 monitors the print result object kept in the record medium holding section 43 (FIGS. 12 and 3) by reading a tag information in the print result object in a fixed cycle so as to prevent being who is not formally identified yet from taking the print result object away. Further, the image forming apparatus 300 also monitors a pass time beginning from that the print ends. The monitoring cycle is desired to be very short so as to immediately detect that the unidentified operator has taken away the print result object from the record medium holding section 43

(FIGS. 12 and 3). According to step order from step S3-11 to step S3-22, the operations will be explained.

Step S3-11:

The print job managing section 71 (FIG. 12) retrieves print job management information stored in the print job management information storing section 70 (FIG. 12).

Step S3-12:

The print job managing section 71 (FIG. 12), by using the retrieved print job management information, judges whether any print result object should remain in the record medium holding section 43 (FIGS. 12 and 3). If the print job managing section 71 judges that no print result object remains, the flow ends; if the print job managing section 71 judges that some print result object should remain, the flow enters step S3-13.

Step S3-13:

The print job managing section 71 (FIG. 12) reads out a record of the extant management information from the print job management information storing section 70 (FIG. 12).

Step S3-14:

The print job managing section 71 (FIG. 12) communicates with the IC tags 2 (FIG. 1) of all print result objects remaining in the record medium holding section 43 (FIGS. 12 and 3) via the identification information reading section 46 (FIGS. 12 and 3), and confirms whether a print result object having the tag information (management information) corresponding to the record of the extant management information exists.

Step S3-15:

In the case that the print result object having the tag information (management information) corresponding to the record of the extant management information exists, the process enters step S3-16; in the case that the print result object having the tag information (management information) corresponding to the record of the extant management information does not exist, the process enters step S3-19.

Step S3-16:

The print job managing section 71 (FIG. 12) calculates an elapsed time that the print result object has been stored in the record medium holding section 43 (FIGS. 12 and 9) beginning from the time that the print has been performed.

Step S3-17:

In the case that the elapsed time is less than an appointed time, the flow enters step S3-18; in the case that the elapsed time exceeds the appointed time, the flow enters step S3-21.

Step S3-18:

The print job managing section 71 (FIG. 12) repeats the steps from S3-13 to S3-18 if the confirmation does not end yet about all records of the extant management information indicating that the corresponding print result objects should remain; if the confirmation of all records of the extant management information ends, the flow ends.

Step S3-19:

The print job managing section 71 (FIG. 12) judges that an operator of the image forming apparatus 100 mistakenly collects the print result object of which the print job the operator she has not sent if the confirmation can not be performed about the remaining print result objects in the record medium holding section 43 (FIGS. 12 and 3). Then, the warning mail notifying section 73 (FIG. 12) makes a warning message indicating that the print result object is mistakenly collected by the operator on the basis of the judgment of the print job managing section 71 (FIG. 12).

Step S3-20:

The warning mail notifying section 73 (FIG. 12) sends the warning message to the sender of the print job via mail (i.e. an e-mail). Then, the flow enters S3-18.

Step S3-21:

The print job managing section 71 (FIG. 12) judges that the sender of the print job has forgot to collect the print result object if the elapsed time exceeds the appointed time. Then, the warning mail notifying section 73 (FIG. 12) makes a warning message indicating that the collection of the print result object is forgot on the basis of the judgment of the print job managing section 71 (FIG. 12).

Step S3-22:

The warning mail notifying section 73 (FIG. 12) sends the warning message to the sender of the print job via mail (i.e. an e-mail). Then, the flow enters S3-18.

Regarding other operations, because they are the same as embodiment 1 or 2, the same explanation is omitted.

As stated in the above, according to the embodiment, to add the effect of embodiments 1 and 2, when the sender of the print job forgets to collect the print result object, it is further possible to prevent the print result object from being placed in the record medium holding section 43 over a long time.

Embodiment 4

In the embodiment, on the basis of a request of manager and the like of the image forming apparatus, it is possible to display management information of all print result objects (i.e. owner information of the print result object) kept in the record medium holding section onto the message inputting and outputting section.

Figure 16:
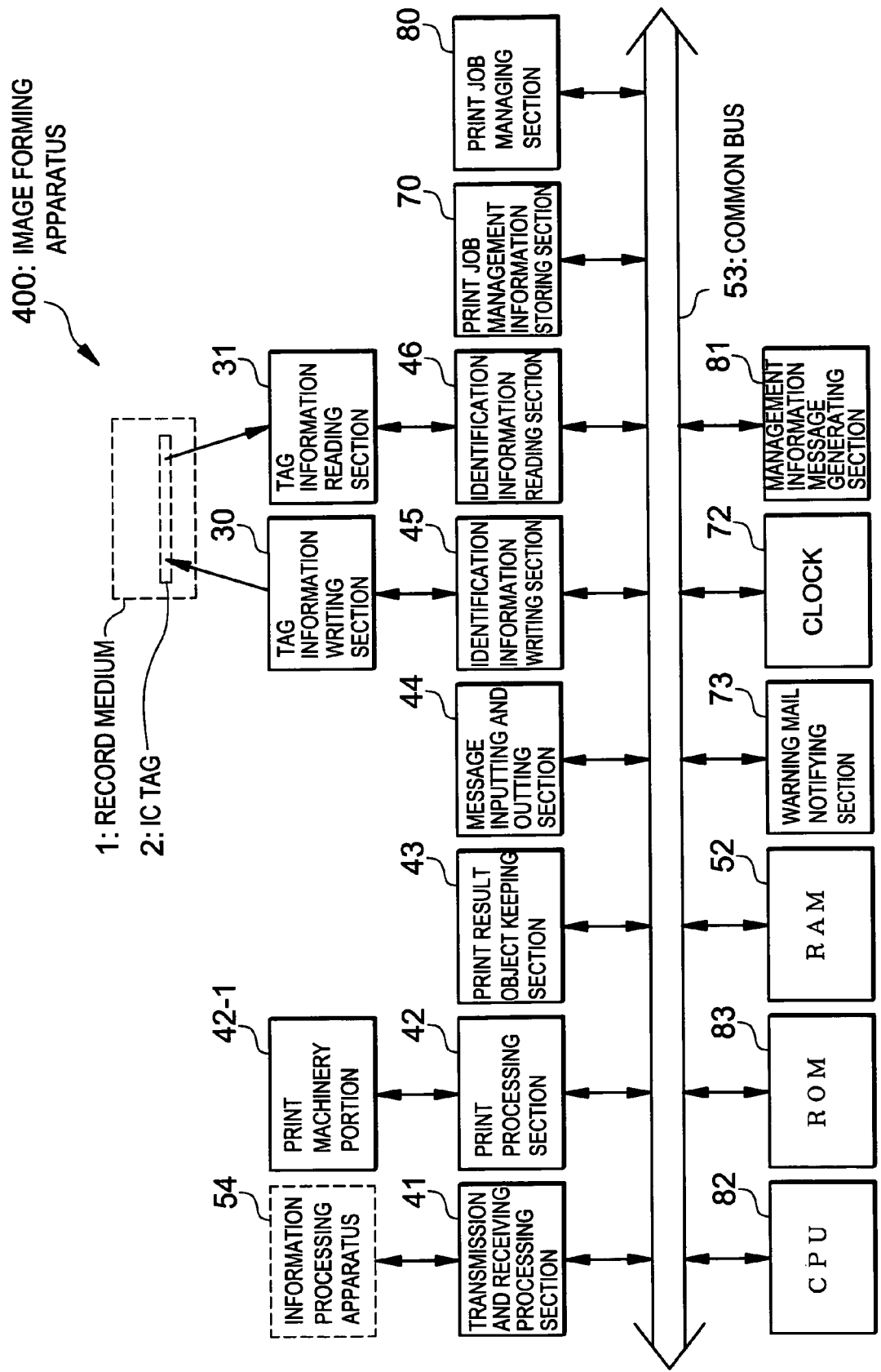
FIG. 16 is a functional block drawing of an image forming apparatus in embodiment 4.

FIG. 16 is a functional block drawing of an image forming apparatus in embodiment 4.

As shown by FIG. 16, the image forming apparatus 400 comprises a transmission and receiving processing section 41, a print processing section 42, a record medium holding section 43, a message inputting and outputting section 44, an identification information writing section 45, an identification information reading section 46, a RAM 52, a print job management information storing section 70, a clock 72, a warning mail notifying section 73, a print job managing section 80, a management information message generating section 81, a CPU 82, a ROM 83 and a common bus 53. In the following, only the part different from the embodiment 3 is explained, while the same part as the embodiment 3 has the same reference number, and its explanation is omitted.

The print job managing section 80 is a part to obtain print job management information from a print job to which print job management information received by the transmission and receiving processing section 41 has been added; to take out necessary information for management of the print job such as the print job name, the password, the management information and the like; to assign the necessary information to respective record mediums 1, and to write the necessary information into the print job management information storing section 70 as the print job management information. The print job managing section 80 is also a part to execute an individual identification of an operator on the basis of sender information inputted into the message inputting and outputting section 44 while the operator attempts to collect the print result object.

Further, the print job managing section 80 is a part to monitor a print result object kept in the record medium holding section 43 in a fixed cycle. Moreover, the print job managing section 80 is also a part to monitor the clock 72 and to store the print end time into the print job management information storing section 70. Furthermore, the print job managing section 80 is also a part to measure an elapsed time that the print result object has been kept in the record medium holding section 43 per the fixed cycle to monitor the print result object in the record medium holding section 43.

Further, the print job managing section 80 makes the management information message generating section 81 generate a message concerning the management information of all print result objects (i.e. owner information of the print result object) currently kept in the record medium holding section 43, on the basis of a request inputted by manager of the image forming apparatus via the message inputting and outputting section 44; and displays the message onto the message inputting and outputting section 44. The print job managing section 80 is driven through the CPU 82 executes a predetermined control program previously stored in the ROM 83.

The management information message generating section 81 is a part to generate a management information message of all print jobs currently stored in the print job management information storing section 70, on the basis of a request of the print job managing section 80. The management information message generating section 81 is driven through the CPU 82 executes a predetermined control program previously stored in the ROM 83.

The CPU 82 is a micro processor to control the whole apparatus by executing a predetermined control program previously stored in the ROM 83, and is a part to drive general image formation functions (its explanation is omitted). Further, in the embodiment, through executing a predetermined control program previously stored in the ROM 83, the CPU 82 drives the above-stated transmission and receiving processing section 41, the print processing section 42, the identification information writing section 45, the identification information reading section 46, the print job managing section 80, the warning mail notifying section 73 and the management information message generating section 81.

The ROM 83 is a read only memory to store a predetermined control program for driving general image formation functions and to execute the control program through the CPU 82. Further, in the embodiment, the ROM 83 is also a read only memory to store a control program to drive the above-stated transmission and receiving processing section 41, the print processing section 42, the identification information writing section 45, the identification information reading section 46, the print job managing section 80, the warning mail notifying section 73 and the management information message generating section 81, and to execute the control program through the CPU 82. Regarding other part, because it is the same as embodiment 3, its explanation is omitted.

Following is to explain operations of image forming apparatus in the embodiment.

Figure 17:
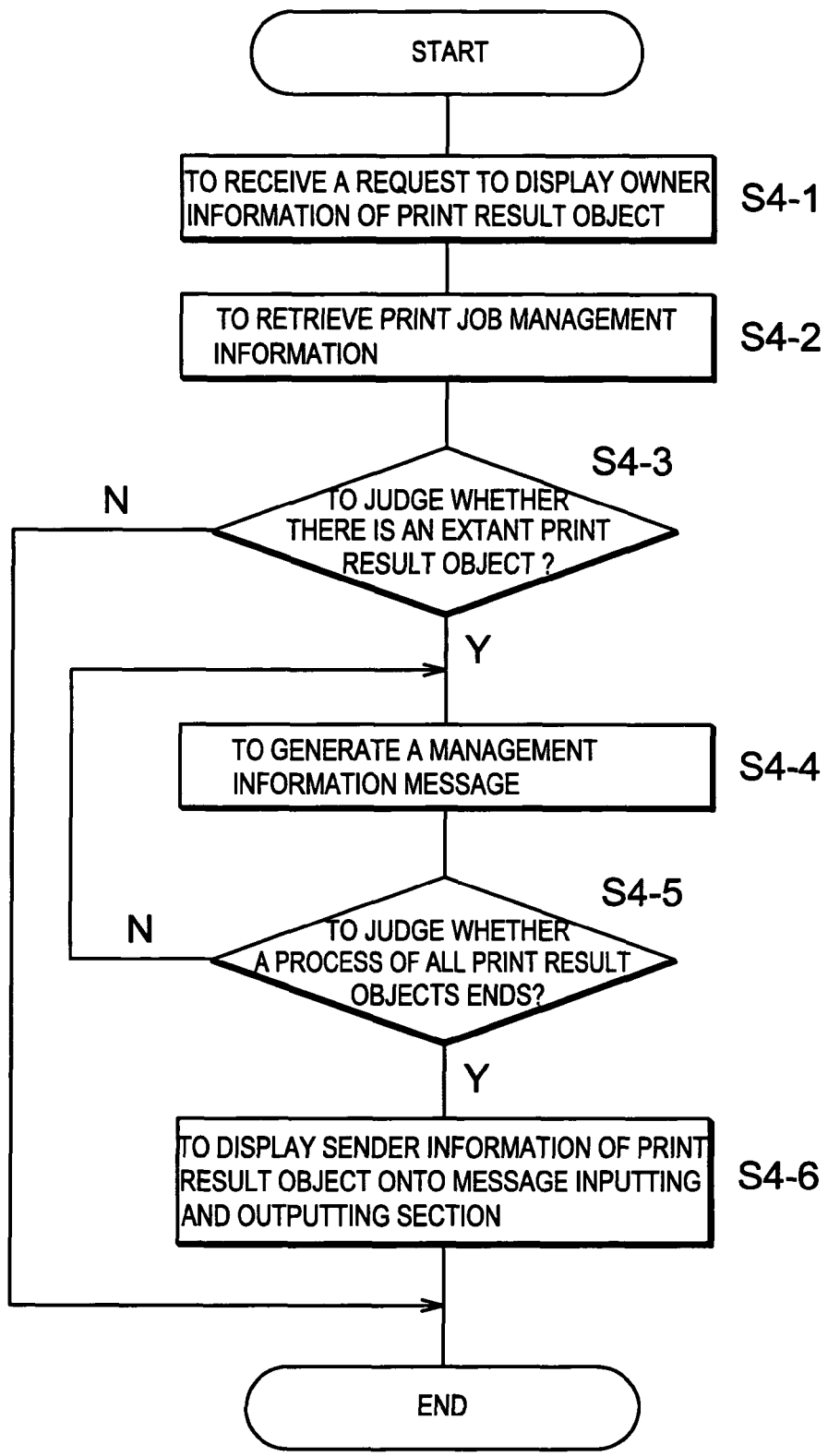
FIG. 17 is a flowchart of print job information display process of an image forming apparatus in embodiment 4.

FIG. 17 is a flowchart of print job information display process of an image forming apparatus in embodiment 4.

The drawing is a flowchart to explain operations to display management information of all print result object (i.e. owner information of the print result object) currently kept in the record medium holding section 43 on the basis of a request from manager and the like of the image forming apparatus. According to the step order from step S4-1 to step S4-6, the operations are explained.

Step S4-1:

The print job managing section 80 (FIG. 16) receives a display request to display the management information of all print result objects (i.e. owner information of the print result object) currently kept in the record medium holding section 43 (FIG. 16) from the manager and the like of the image forming apparatus via the message inputting and outputting section 44 (FIG. 16).

Step S4-2:

The print job managing section 80 (FIG. 16) retrieves print job management information stored in the print job management information storing section 70 (FIG. 16).

Step S4-3:

The print job managing section 80 (FIG. 16), by using the retrieved print job management information, judges whether the any print result object should remain in the record medium holding section 43 (FIGS. 16 and 3). If the print job managing section 80 judges that no print result object remains, the flow ends; if the print job managing section 80 judges that some print result object should remain, the flow enters step S4-4.

Step S4-4:

The print job managing section 80 (FIG. 16) makes the management information message generating section 81 generate a management information message. Then, the management information message generating section 81 generates the management information message.

Step S4-5:

The management information message generating section 81 repeats the steps S4-4 and S4-5 till all management information messages are generated with respect to the remaining print result objects. When all the management information messages are generated, the flow enters the next.

Step S4-6:

The print job managing section 80 (FIG. 16) displays the all management information messages onto the message inputting and outputting section 44 (FIG. 16), and ends the flow.

As stated in the above, according to the embodiment, because another person expects the sender of the print job, for example, the manager of the image forming apparatus could have command of the owner of the print result object kept in the record medium holding section of the image forming apparatus, it is possible to prevent the print result object from being placed in the record medium holding section intact, and to improve maintenance of the image forming apparatus.

Embodiment 5

In fact, in a printer as an image forming apparatus, there are generally a record medium to which an IC tag is added and a record medium to which an IC tag is not added. According the embodiment, in the case that the print result object corresponding to a user's own print job has a possibility that the print result object can be taken away by an operator who has not sent the print job of print result object, before a print is executed, the user selects the record medium having the IC tag in one tray of record medium via a print driver; in the case that the print result object corresponding to a user's own print job has no a possibility that the print result object can be taken away by an operator who has not sent the print job of print result object, before a print is executed, user selects the record medium having no the IC tag from one tray of record medium via a print driver. In the embodiment, the record medium to which an IC tag is added and the record medium to which an IC tag is not added are previously stored in respective trays.

The structure of the embodiment is almost the same as that of the embodiment 1 (FIG. 1), and the information processing apparatus 54 has the following operations.

Figure 18:
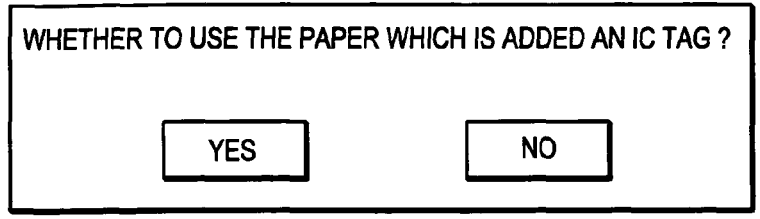
FIG. 18 is a display screen of information processing apparatus in embodiment 5.

In the case that a user requests to print, when the user selects "Yes" in a screen (FIG. 18) indicating whether to select the IC tag-added record medium by using the information processing apparatus 54, a command indicating to use the IC tag-added record medium is sent to printer together with print data via a print driver; and when the user selects "No", a normal print job is sent.

Figure 19:
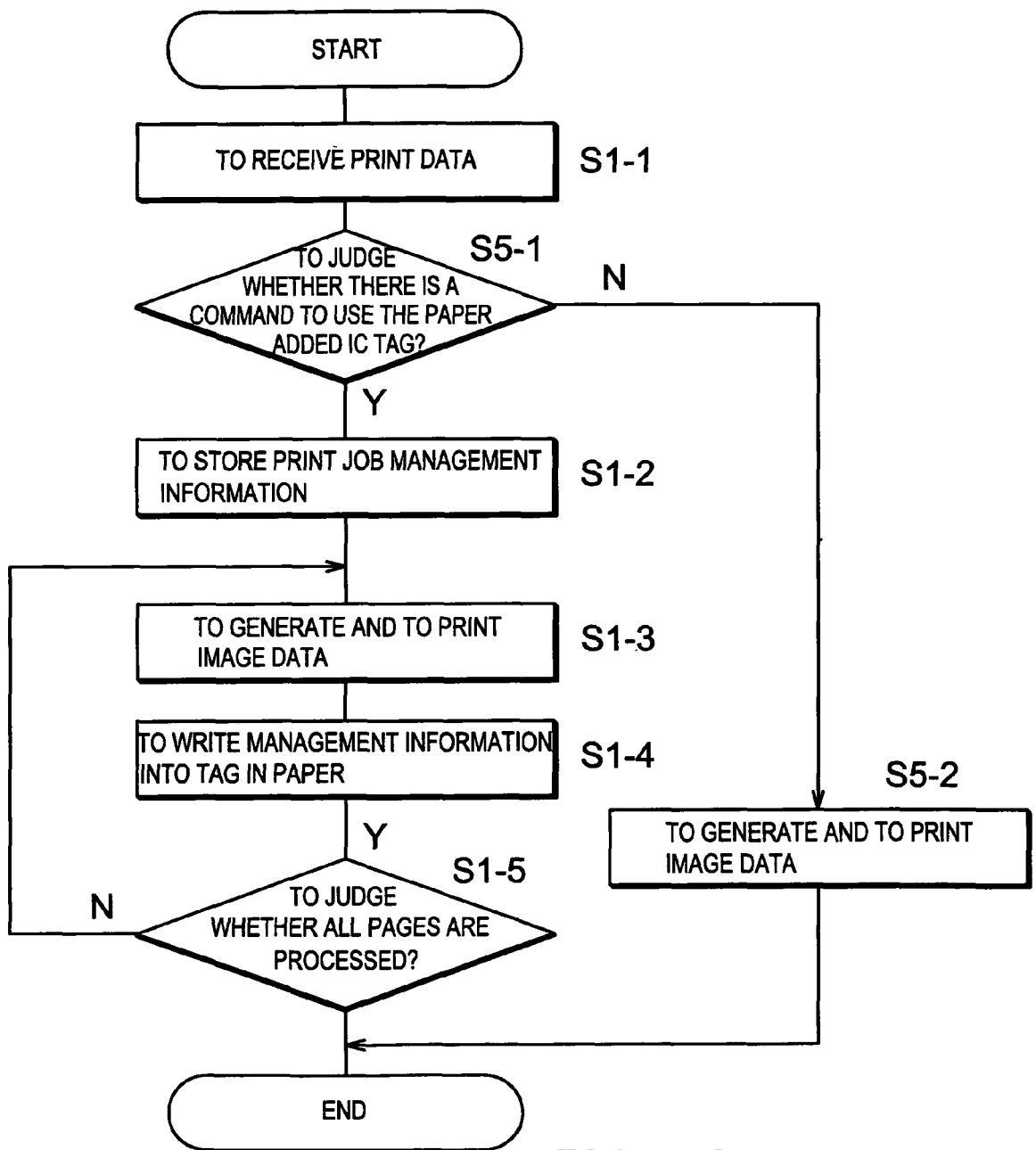
FIG. 19 is a flowchart of print process of an image forming apparatus in embodiment 5.

FIG. 19 is a flowchart of print process of an image forming apparatus in embodiment 5.

The differences between FIG. 19 and FIG. 5 are as follows: in FIG. 19, the printer analyzes whether there is a command to use the IC tag-added record medium (step S5-1) in the received print job, if there is the command to use the IC tag-added record medium, the same process as the embodiment 1 is executed; if there is not, as a normal print job, the printer generates image data and performs a print (step S5-2), then ends the print process. Moreover, such construction (S5-1) in the embodiment may be also applied in to the above-stated embodiments 2, 3, and 4.

As stated above, in the embodiment, only in the case that the print result object corresponding to a user's print job has a possibility that the print result object can be taken away by an operator who has not sent the print job of print result object, before a print is executed, the user selects the record medium having the IC tag from one tray of record medium via a print driver, and requests a print, so it is possible to reduce costs.

Moreover, in the above description, the identification information writing section and the identification information reading section are formed in the printer as an image forming apparatus. However, the identification information writing section and the identification information reading section may be formed in outside of the printer, in that case, they may respectively communicate with an image forming apparatus substance via network.

Further, in the above description the communication between the IC tag and the printer as an image forming apparatus is performed using electromagnetic induction (electromagnetic inductor). However, it is possible to use an electric wave.

Furthermore, in the above description, it is explained to apply the present invention to printer. However, the present invention may also be applied to such image forming apparatus as a copying apparatus, a facsimile apparatus, a MFP and the like.

The present invention is not limited to the foregoing embodiments but many modifications and variations are possible within the spirit and scope of the appended claims of the invention.

What is claimed is:

1. An image forming apparatus for forming images onto printable record media, each printable record medium having an identification information section providing identification information to identify the printable record medium, the apparatus comprising:
a print job management information storing section for storing management information for a print job, the print job management information being sent from an information processing apparatus and containing separate identification information to identify each of the printable record media on which images for the print job are formed when the print job is completed;
a record medium holding section for holding as print result objects the printable record media having images formed thereon;
means for collating the print job management information in said print job management information storing section with the identification information of the print result objects held in said record medium holding section; and
a print job managing section to make a judgment, on the basis of a result of the collation, whether all print result objects corresponding to the completed print job are in said record medium holding section, and to make a predetermined notifying section produce a notification when the judgment is that all the print result objects are not in said record medium holding section.

2. The image forming apparatus according to claim 1, wherein the print job corresponds to a particular print job sender, the particular print job sender inputs user identification information to identify the particular print job sender when removing the print result objects from said record medium holding section, said print job managing section monitors the print result objects for correspondence with the particular print job sender, and said print job managing section detects a failure of the particular print job sender to input user identification information and an absence of any print result object corresponding to the completed print job, and makes the predetermined notifying section produce a notification.

3. The image forming apparatus according to claim 1, further comprising:
an identification information writing section to write the identification information into the identification information section; and
an identification information reading section to read out the identification information from the identification information section.

4. The image forming apparatus according to claim 2, wherein said print job managing section detects a print job sender who has removed a print result object of the completed print job from said record medium holding section and whose inputted user identification information does not match the user identification information of the particular print job sender, and makes the predetermined notifying section produce a notification indicating that the inputted user identification information does not match the user identification information of the particular print job sender.

5. The image forming apparatus according to claim 1, wherein the notification is a visual or audio notification.

6. The image forming apparatus according to claim 2, wherein the predetermined notifying section sends a mail notification to the particular print job sender.

7. The image forming apparatus according to claim 1, wherein said print job managing section monitors an elapsed time that each print result object has been held in said record medium holding section, and when the elapsed time has exceeded an appointed time, makes the predetermined notifying section produce a notification indicating that said elapsed time has exceeded the appointed time.

8. The image forming apparatus according to claim 7, wherein the print job corresponds to a particular print job sender, said print job managing section monitors a print result object of the completed print job, and when the elapsed time of the print result object has exceeded the appointed time, the predetermined notifying section sends a mail notification to the particular print job sender.

9. The image forming apparatus according to claim 1, wherein when said print job management information storing section stores management information for a plurality of print jobs, said print job managing section receives a predetermined request, and outputs a message containing the print job management information for print jobs of all print result objects currently held in said record medium holding section.

10. The image forming apparatus according to claim 1, wherein the information processing apparatus receives a predetermined request, and designates either the printable record medium having the identification information or another record medium so that an image is formed on the designated record medium.

11. The image forming apparatus according to claim 1, wherein the identification information section is a tag capable of communicating with the image forming apparatus by using electromagnetic induction or an electric wave.

12. An image forming system, comprising:

an information processing apparatus and an image forming apparatus for forming images onto printable record media, each printable record medium having an identification information section providing identification information to identify the printable record medium, the image forming apparatus comprising:

a print job management information storing section for storing management information for a print job, the print job management information being sent from said information processing apparatus and containing separate identification information to identify each of the printable record media on which images for the print job are formed when the print job is completed;

a record medium holding section for holding as print result objects the printable record media having images formed thereon;

means for collating the print job management information in said print job management information storing section with the identification information of the print result objects held in said record medium holding section; and a print job managing section to make a judgment, on the basis of a result of the collation, whether all print result objects corresponding to the completed print job are in said record medium holding section, and to make a predetermined notifying section produce a notification when the judgment is that all the print result objects are not in said record medium holding section.

13. The image forming apparatus according to claim 4, wherein said print job managing section, when the inputted user identification information of the print job sender matches the user identification information of the particular print job sender, deletes the print job management information for the completed print job from said print job management information storing section.

14. The image forming apparatus according to claim 1, wherein said print job management information storing section stores management information for a plurality of print jobs and when each of the plurality of print jobs is completed, images for said each print job are formed on each of the printable record media.

15. The image forming apparatus according to claim 12, wherein said print job management information storing section stores management information for a plurality of print jobs and when each of the plurality of print jobs is completed, images for said each print job are formed on each of the printable record media.

* * * * *